July 4, 1944.                R. F. METZGER                2,352,729
                              LENS MOUNTING
                           Filed Dec. 28, 1940
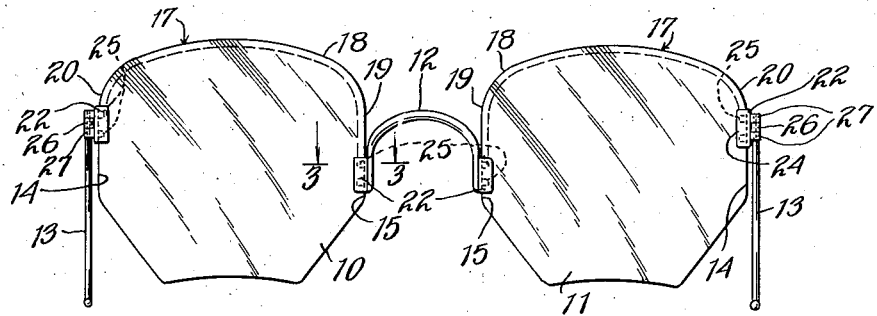
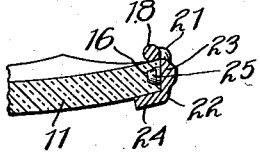 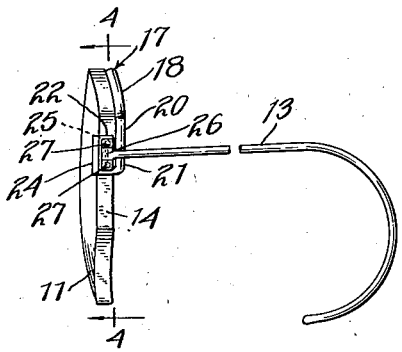
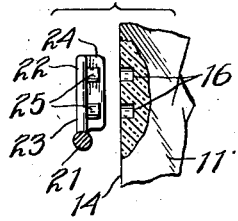 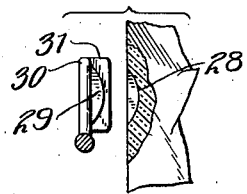 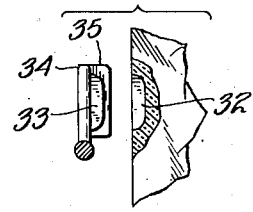
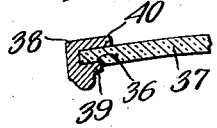
INVENTOR
REINHARDT FREDERICK METZGER
BY
ATTORNEY Patented July 4, 1944

2,352,729

UNITED STATES PATENT OFFICE 2,352,729

LENS MOUNTING

Reinhardt Frederick Metzger, Glendale, Long Island, N. Y.

Application December 28, 1940, Serial No. 372,029

6 Claims. (Cl. 88—47)

This invention relates to mountings for use in connection with eyeglass lenses for supporting the nose bridges and ear loops or other types and kinds of attachments to glasses; and the object of the invention is to provide a mounting of the class described having a spring tong-like engagement with the peripheral edges of the lens and particularly where comparatively thick lenses are employed so that the lens may be quickly and easily attached and detached with respect to the mounting, and eliminating the use of cement, screws, rivets, and other fastening devices, such as are commonly employed; a further object being to provide tong-like frames for mountings of the character described wherein the terminal ends thereof include lens engaging projections which extend longitudinally of or are spaced longitudinally of the periphery of the lens to support the lens against tilting movement in the frames, and further to the provision of means reinforcing and concealing that part of the lens in which the terminal projections are arranged; and with these and other objects in view, the invention consists in a mounting of the class and for the purpose specified which is simple in construction, efficient in use, and which is constructed as herein described.

The invention is fully described in the following specification, of which the accompanying drawing forms a part, in which the separate parts of my improvement are designated by suitable reference characters in each of the views; and in which:

Fig. 1 is a front view of a pair of eyeglasses diagrammatically illustrating the arrangement of my improved mounting thereon.

Fig. 2 is a side edge view of the structure as seen in Fig. 1.

Fig. 3 is a partial section on the line 3—3 of Fig. 1 on an enlarged scale.

Fig. 4 is a detail sectional view substantially on the line 4—4 of Fig. 2, omitting part of the construction and illustrating the parts in separated position with one part broken away and in section.

Fig. 5 is a view similar to Fig. 4, showing a modified adaptation of the invention.

Fig. 6 is a view similar to Figs. 4 and 5 showing another modification; and

Fig. 7 represents a transverse sectional view which might be taken through any one of the structures as seen in Figs. 4, 5, and 6 when in assembled position and showing another adaptation of the invention.

To diagrammatically illustrate one of many types and kinds of eyeglass structures, I have indicated in Fig. 1 of the drawing a pair of glasses comprising two lenses 10 and 11, a nose bridge 12 and ear loops 13. In the construction shown outer side edges 14 and inner side edges 15 of both lenses have longitudinally spaced sockets 16 as most clearly illustrated in Fig. 4 of the drawing. These sockets are arranged at different vertical levels on the periphery of the lens to provide what might be termed the high mounting of the ear loops in connection with the conventional nose mounting or bridge.

At 17 are shown two identical lens supporting frames; and as these frames are of the same construction, the brief description of one will apply to the other. Each frame comprises a loop-shaped rod or strip 18, which is shaped to conform with the peripheral contour of the lens and is preferably located at the periphery of the lens in the manner illustrated so as to become substantially invisible when viewing the lenses from the front of the eyeglasses or spectacles. The rods or strips 18 are of spring construction. The downwardly extending ends of the strips 18, namely 19 and 20, the end 19 being termed the inner end; and the end 20 the outer end for purposes of description, have offset portions 21 extending in the direction of the periphery of the lens. These portions also extend outwardly and upwardly to form terminal clip ends 22 which are of substantially L-shaped cross sectional form. As will appear upon a consideration of Fig. 3 of the drawing, the part 23 of these ends rests upon the periphery of the lens, whereas the part 24 rests upon the outer surface of the lens to reinforce the lens and also to cover the recesses or apertures 16 formed therein. The parts 23 of the terminal ends 22 have spaced projecting pins 25 adapted to enter the spaced recesses 16, as clearly seen in Fig. 4 of the drawing.

It will, of course, be understood that the normal spring properties of the lens frame tend to move the terminal ends 22 toward each other and in mounting the lens in the frame, the terminal ends are separated by placing one side edge, for example the edge 15 of the lens in its associated coupling 22, and then springing the outer coupling 22 over the outer peripheral edge 14. In detaching the lens the outer coupling 22 is first moved out of engagement with the sockets 16 and the edge 14 as will be apparent.

It will, of course, be apparent that any type of nose bridge construction may be employed;

and this bridge may be attached to the terminal ends 22 in any desired manner. It will also appear that when ear loops are employed, such as the loops 13, the forward ends 26 of these loops may have any desired mounting in connection with the couplings 22. In the construction shown, the ends 26 are illustrated as pivoted between bearings 27 arranged upon outer terminal ends or couplings 22.

In Fig. 5 of the drawing is shown a slight modification of the construction shown in Figs. 1 to 4 inclusive, wherein an arc-shaped recess 28 is substituted for the two recesses 16; and an elongated arc-shaped projection 29 is provided on the couplings 30 to enter the recess 28. This type of construction will form a sufficient key action to retain the lens against tilting action in the mounting frame. The terminal ends of the frame will also include cover plates 31, similar to the plates 24.

In Fig. 6 of the drawing is shown another adaptation of the invention wherein an elongated recess 32 is provided in the periphery of the lens, and an elongated key rib or member 33 is provided on the terminal or coupling end 34, the reinforcing and cover plate 35 also being employed.

In Fig. 7 of the drawing I have illustrated that it is not essential that the recesses in the lens be disposed intermediate inner and outer surfaces of the lens; and where thinner lenses are employed, the recesses of the type and kind illustrated in Figs. 4, 5, and 6 may be disposed on either side surface of the lens, but preferably on the inner surface. In Fig. 7, the recess in the lens is shown at 36 opening through the inner surface 37 of the lens, and the coupling or terminal end 38 of the frame is provided with a projection or projections 39 for entering the recessed portion of the lens as at 36. In other words, the recesses 36 may take the place of the recesses 16, 28, 32; and the projection 39 may take the place of the projections 25, 29 and 33, as shown in Figs. 4, 5, and 6 of the drawing. The terminal end 38 of the frame also includes the cover and reinforcing plate 40, and in all instances it will appear that this plate in addition to covering the coupling or recessed portion of the lens also serves to reinforce that part of the lens in connection with which the couplings are mounted.

It will appear that the offset part 21 in conjunction with the part 23 forms what might be termed a hook-shaped terminal end, the parts 21 and 23 being disposed substantially parallel to each other. This construction provides for adjustment of the U-frame with respect to the rear surface of the lens, either by placing a tool between the parts 21, 23 and separating said parts, or by pinching the parts together by a pair of pliers. In this connection, it will be apparent that the U-frame may be disposed upon the inner surface of the lens, or this frame may be slightly spaced therefrom.

It will be understood that when using key or coupling elements of the type and kind illustrated in Figs. 5 and 6 on the terminal ends of the tong-like frame members, these elements may be made very thin to fit in narrow slots formed in the peripheral edge of the lens, thus adapting the device to lenses of thin construction. It would appear that my present construction of snap-on mounting frame for lenses may be applied to lenses without altering the sizes of more or less standardized lens structures; that is to say, where lenses are pre-made to a given dimension, these lenses may simply be shaped to form the key sockets for receiving the key elements of the mounting frame.

Having fully described my invention, what I claim as new and desire to secure by Letters Patent is:

1. A lens mounting frame of the class described, comprising two U-shaped frame parts, each part having a terminal end, each terminal end comprising an outer wall adapted to be arranged upon the peripheral edge of a lens and a side wall adapted to be arranged upon one side surface of a lens, a bridge coupling and spacing adjacent ends of the frame parts, a lens yieldably clamped within each frame part, the outer wall of each terminal end having inwardly projecting members spaced from said side wall and of a thickness less than the thickness of the peripheral edge of the lens and extending in the direction of and arranged perpendicularly to the lens edge, said lenses having in the periphery thereof recesses conforming to the contour of said projections, said recesses being of a width less than the thickness of the lenses and correspondingly spaced from said side walls for snugly receiving said projections in retaining the lenses against displacement from said frame parts, and said projections and recesses being arranged longitudinally of the edges of the lenses, thereby forming means preventing relative twisting of said frame parts and lenses.

2. A lens mounting frame of the class described, comprising two U-shaped frame parts, each part having a terminal end, each terminal end comprising an outer wall adapted to be arranged upon the peripheral edge of a lens and a side wall adapted to be arranged upon one side surface of a lens, a bridge coupling and spacing adjacent ends of the frame parts, a lens yieldably clamped within each frame part, the outer wall of each terminal end having inwardly projecting members spaced from said side wall and of a thickness less than the thickness of the peripheral edge of the lens and extending in the direction of and arranged perpendicularly to the lens edge, said lenses having in the periphery thereof recesses conforming to the contour of said projections, said recesses being of a width less than the thickness of the lenses and correspondingly spaced from said side walls for snugly receiving said projections in retaining the lenses against displacement from said frame parts, said projections and recesses being arranged longitudinally of the edges of the lenses, thereby forming means preventing relative twisting of said frame parts and lenses, and the terminal ends of the frame parts including portions extending onto other side surfaces of said lenses.

3. An eyeglass lens mounting of the class described for quick attachment and detachment of lenses therewith said mounting comprising a pair of substantially similar U-shaped spring frames, means coupling adjacent ends of said frames, each frame of the mounting terminating at its free end in a lens engaging part comprising an outer wall adapted to engage the peripheral edge of a lens and an angular side wall for engaging one side surface of a lens, the outer wall of said part having inwardly projecting key elements spaced from and arranged within the boundaries of the side wall of said part and of a thickness less than the thickness of the lens to be supported in said frame, and said key elements being integral with said outer wall and spaced longitudinally thereof.

4. An eyeglass lens mounting of the class described for quick attachment and detachment of lenses therewith said mounting comprising a pair of substantially similar U-shaped spring frames, means coupling adjacent ends of said frames, each frame of the mounting terminating at its free end in a lens engaging part comprising an outer wall adapted to engage the peripheral edge of a lens and an angular side wall for engaging one side surface of a lens, the outer wall of said part having inwardly projecting key elements spaced from and arranged within the boundaries of the side wall of said part and of a thickness less than the thickness of the lens to be supported in said frame, said key elements being integral with said outer wall and spaced longitudinally thereof, and the ends of said frames having the lens engaging parts including portions adapted to extend onto other side surfaces of the lenses and spaced with respect to said key elements.

5. In lens mountings of the class described, the combination with a lens having longitudinally arranged recesses at spaced intervals of the edges of the lens and opening only through said edges, of a U-shaped frame having yieldable tong-like engagement with the lens, said frame having terminal ends, said terminal ends each having inwardly extending and longitudinally arranged coupling elements conforming to and snugly engaging the recesses in the lens edges in firmly supporting the lens in said frame, said elements extending perpendicularly to the lens edges, and said terminal ends including walls arranged upon one surface of the lens and spaced from said elements.

6. In lens mountings of the class described, the combination with a lens having longitudinally arranged recesses at spaced intervals of the edges of the lens and opening only through said edges, of a U-shaped frame having yieldable tong-like engagement with the lens, said frame having terminal ends, said terminal ends each having inwardly extending and longitudinally arranged coupling elements conforming to and snugly engaging the recesses in the lens edges in firmly supporting the lens in said frame, said elements extending perpendicularly to the lens edges, said terminal ends including walls arranged upon one surface of the lens and spaced from said elements, and one end of the frame being shorter than the other end to dispose said ends in different positions with respect to the optical center of the lens arranged in the frame.

REINHARDT FREDERICK METZGER.